United States Patent
Kikuchi et al.

(10) Patent No.: US 8,493,038 B2
(45) Date of Patent: Jul. 23, 2013

(54) VEHICLE-USE POWER GENERATION CONTROL APPARATUS AND VEHICLE-USE POWER GENERATION CONTROL SYSTEM

(75) Inventors: Tsukasa Kikuchi, Ama-gun (JP); Tomomi Tsuzuki, Toyota (JP); Liang Song, Chiryu (JP)

(73) Assignee: Denso Corporation, Kariya (JP)

(*) Notice: Subject to any disclaimer, the term of this patent is extended or adjusted under 35 U.S.C. 154(b) by 460 days.

(21) Appl. No.: 12/939,364

(22) Filed: Nov. 4, 2010

(65) Prior Publication Data

US 2011/0109278 A1    May 12, 2011

(30) Foreign Application Priority Data

Nov. 9, 2009  (JP) ................................. 2009-255913
Mar. 23, 2010  (JP) ................................. 2010-065799

(51) Int. Cl.
*H02P 11/00*   (2006.01)
*H02P 9/00*    (2006.01)

(52) U.S. Cl.
USPC .................................. 322/59; 322/28; 322/44

(58) Field of Classification Search
USPC .......................... 322/59, 44, 24, 28; 307/10.1
See application file for complete search history.

(56) References Cited

U.S. PATENT DOCUMENTS

| 2006/0238143 A1 | 10/2006 | Uematsu et al. | |
| 2009/0058372 A1* | 3/2009 | Tsuzuki | 322/18 |
| 2009/0121689 A1* | 5/2009 | Kikuchi et al. | 322/34 |
| 2011/0109278 A1* | 5/2011 | Kikuchi et al. | 322/59 |

FOREIGN PATENT DOCUMENTS

| JP | 9-107640 | 4/1997 |
| JP | P2000-110610 A | 4/2000 |
| JP | P2001-245441 A | 9/2001 |
| JP | P2005-057853 A | 3/2005 |
| JP | P2006-121869 A | 5/2006 |
| JP | P2006-246574 A | 9/2006 |
| JP | 2006-271096 | 10/2006 |
| JP | 2006-271906 | 10/2006 |
| JP | 3931481 | 3/2007 |
| JP | P2007-270773 A | 10/2007 |

* cited by examiner

*Primary Examiner* — Julio Gonzalez
(74) *Attorney, Agent, or Firm* — Nixon & Vanderhye PC

(57) ABSTRACT

The vehicle-use power generation control apparatus includes a first section to control an excitation current of a vehicle generator driven by a vehicle engine such that a power generation voltage of the vehicle generator is kept at a first set value, a second section to perform gradual excitation control in order to gradually increase the excitation current, a third section configured to inhibit the gradual excitation control when the power generation voltage falls below a second set value lower than the first set value while the gradual excitation control is performed, a fourth section to detect a rotational speed of the vehicle engine or the vehicle generator, a fifth section to determine a limit value of the excitation current based on the detected rotational speed, and a sixth section configured to limit the excitation current below the limit value when the power generation voltage falls below the second set value.

5 Claims, 7 Drawing Sheets

VEHICLE-USE POWER GENERATION CONTROL APPARATUS AND VEHICLE-USE POWER GENERATION CONTROL SYSTEM

This application claims priority to Japanese Patent Applications No. 2009-255913 filed on Nov. 9, 2009 and No. 2010-65799 filed on Mar. 23, 2010, the entire contents of which are hereby incorporated by reference.

BACKGROUND OF THE INVENTION

1. Field of the Invention

The present invention relates to a vehicle-use power generation control apparatus and a vehicle-use power generation control system.

2. Description of Related Art

Recent vehicles have lower idle speeds and lower engine frictions to improve fuel efficiency, and accordingly, torque variation caused when a vehicle accessory starts operation affects engine rotational speed more substantially. As a technique to stabilize rotational speed of a vehicle engine in the idle state, it is known to perform so-called gradual excitation control in order to restrict power generation increase rate of a vehicle generator when the vehicle engine idles, to thereby prevent the generator torque from rapidly increasing. The voltage of a vehicle battery charged by the vehicle generator falls substantially when the vehicle generator is applied with a large electrical load while the gradual excitation control is in operation. Accordingly, if the vehicle battery is in an over-discharged condition, or in a condition where its internal resistance is excessively large, or in a condition where its terminal is loosely connected, the operating voltage of vehicle-mounted equipment supplied with electricity from the vehicle battery may drop as low as 10 V. In this case, the vehicle mounted equipment including an engine control unit may malfunction or may suffer system fail.

To deal with this disadvantage, there is known a technique in which the gradual excitation control is inhibited when the power generation voltage (the output voltage of the vehicle generator) falls below a predetermined voltage in order to restore the power generation voltage to its normal level. For example, refer to Japanese Patent Application Laid-Open No. H9-107640.

However, the above technique has a problem in that when the power generation voltage falls below the predetermined voltage, and accordingly the gradual excitation control is inhibited, since the generator torque rapidly increases, the vehicle engine may be stalled if its piston displacement is not sufficiently large.

Further, the above technique has a problem in that since the gradual excitation control (power generation restriction control) is inhibited when the power generation voltage falls below the predetermined voltage, if the power generation voltage rises and falls around this predetermined voltage at frequent intervals, the gradual excitation control is inhibited and resumed at frequent intervals. In this case, the engine rotational speed is likely to fluctuate widely, and it may become difficult or may be late to recover the operating voltage of the vehicle mounted equipment which has fallen due to the fall of the power supply voltage. The rotational speed of a vehicle generator driven by a vehicle engine varies coincidentally with engine ignition timing, and the power generation voltage of the vehicle generator varies along with the variation of the rotational speed. Accordingly, if the power generation voltage comes close to a threshold to determine inhibition of the gradual excitation control, the power generation voltage rises and falls around the threshold at frequent intervals causing the above problem.

SUMMARY OF THE INVENTION

The present invention provides a vehicle-use power generation control apparatus comprising:

a first section configured to control an excitation current of a vehicle generator driven by a vehicle engine such that a power generation voltage of the vehicle generator is kept at a first set value;

a second section configured to perform gradual excitation control in order to gradually increase the excitation current when the first section outputs an excitation drive signal commanding an increase of the excitation current;

a third section configured to inhibit the gradual excitation control by the second section when the power generation voltage falls below a second set value lower than the first set value while the gradual excitation control is performed;

a fourth section to detect a rotational speed of one of the vehicle engine and the vehicle generator;

a fifth section to determine a limit value of the excitation current based on the rotational speed detected by the fourth section; and a sixth section configured to limit the excitation current below the limit value determined by the fifth section when the power generation voltage falls below the second set value.

The present invention also provides a vehicle-use power generation control system comprising:

a vehicle-use power generation control apparatus configured to perform power generation control of a vehicle generator driven by a vehicle engine; and an external control apparatus configured to transmit a power generation command signal to the vehicle-use power generation control apparatus;

wherein the vehicle-use power generation control apparatus includes:

a first section configured to control an excitation current of the vehicle generator such that a power generation voltage of the vehicle generator is kept at a first set value;

a second section configured to perform gradual excitation control in order to gradually increase the excitation current when the first section outputs an excitation drive signal commanding to increase the excitation current;

a third section configured to inhibit the gradual excitation control by the second section when the power generation voltage falls below a second set value lower than the first set value while the gradual excitation control is performed; and a fourth section configured to limit the excitation current below a limit value when the power generation voltage falls below the second set value;

the external control apparatus being configured to transmit the power generation command signal including the limit value determined based on a rotational speed of one of the vehicle engine and the vehicle generator to the vehicle-use power generation control apparatus.

The present invention also provides a vehicle-use power generation control apparatus comprising: a first section configured to control an excitation current of a vehicle generator driven by a vehicle engine of a vehicle such that a power generation voltage of the vehicle generator is kept at a first set value;

a second section configured to perform restriction control to restrict an increase rate of the excitation current when the excitation current is increased by the first section;

a third section configured to inhibit the restriction control when the power generation voltage falls below a second set value lower than the first set value while the restriction control is performed by the second section; and a fourth section configured to maintain inhibition of the restriction control until the power generation voltage exceeds a third set value higher than the second set value and lower than the first set value after the restriction control is inhibited by the third section.

The present invention also provides a vehicle-use power generation control apparatus comprising:

a first section configured to control an excitation current of a vehicle generator driven by a vehicle engine of a vehicle such that a power generation voltage of the vehicle generator is kept at a first set value;

a second section configured to perform restriction control to restrict an increase rate of the excitation current when the excitation current is increased by the first section;

a third section configured to inhibit the restriction control when the power generation voltage falls below a second set value lower than the first set value while the restriction control is performed by the second section; and a fourth section configured to maintain inhibition of the restriction control by the third section until a predetermined time period elapses after the restriction control is inhibited by the third section.

According to the present invention, there are provided a vehicle-use power generation control apparatus and a vehicle-use power generation system which are capable of preventing occurrence of engine stall when the power generation voltage of a vehicle generator drive by a vehicle engine falls.

According to the present invention, there is also provided a vehicle-use power generation control apparatus capable of stabilizing rotation of a vehicle engine and restoring power generation voltage of a vehicle generator driven by the vehicle engine when power generation restriction control is performed to deal with fall of the power generation voltage.

Other advantages and features of the invention will become apparent from the following description including the drawings and claims.

PREFERRED EMBODIMENTS OF THE INVENTION

First Embodiment

Figure 1:
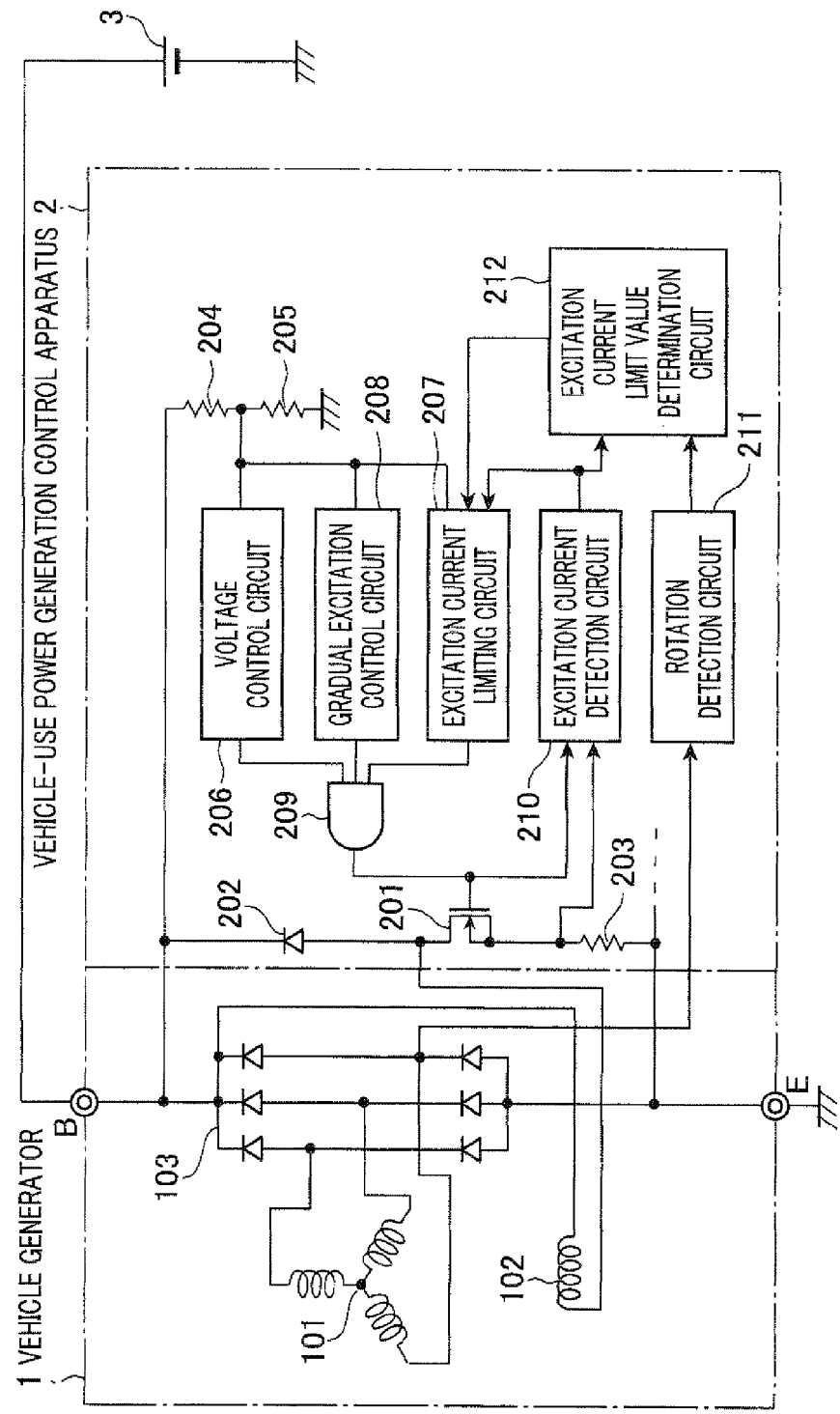
FIG. 1 is a diagram showing the structure of a vehicle-use power generation control apparatus as a first embodiment of the invention.

FIG. 1 shows the structure of a vehicle-use power generation control apparatus 2 as a first embodiment of the invention, and a connection state of the power generation control apparatus 2 with a vehicle generator 1 and a battery 3. Referring to FIG. 1, the power generation control apparatus 2 performs power generation control to keep the voltage of the output terminal (B-terminal) of a vehicle generator 1 driven by a vehicle engine at a set value of a regulation voltage. The power generation control apparatus 2 includes a ground terminal (E-terminal) other than the B-terminal. The B-terminal is connected to the battery 3 through a charge line, and also connected to various electrical loads (not shown). The E-terminal is connected to the frame of the vehicle generator 1. Although the power generation control apparatus 2 is shown separately from the vehicle generator 1 in FIG. 1, it is included in the vehicle generator 1.

The vehicle generator 1 includes a stator around which a three-phase stator winding 101 is wound, a rotor around which an excitation winding 102 is wound, and a rectifier circuit 103 for full-wave rectifying the three-phase output of the stator winding 101. The output of the rectifier circuit 103 as the output voltage of the vehicle generator 1 is controlled by on/off-controlling passage of an excitation current to the excitation winding 102 by the power generation control apparatus 2.

The structure and operation of the power generation control apparatus 2 are explained below in further detail. As shown in FIG. 1, the power generation control apparatus 2 includes an N-channel MOSFET 201, a flywheel diode 202, a sense resistor 203, resistors 204 and 205, a voltage control circuit 206, an excitation current limiting circuit 207, a gradual excitation control circuit 208, an AND circuit 209, an excitation current measurement circuit 210, a rotation detection circuit 211, and an excitation current limit value determination circuit 212.

The MOSFET 201 is series-connected to the excitation winding 102. The excitation current is passed to the excitation winding 102 while the MOSFET 201 is in the ON state. The flywheel diode 202 is parallel-connected to the excitation winding 102. The flywheel diode 202 passes an inductor current of the excitation winding 102 generated when the MOSFET 201 is turned off.

The resistors 204 and 205 constitute a voltage divider circuit. The output voltage (power generation voltage) of the vehicle generator 1 is divided by this voltage divider circuit and supplied to the voltage control circuit 206. The voltage control circuit 206 measures the power generation voltage based on the voltage applied from the voltage divider circuit, and controls the excitation current of the vehicle generator 1 such that the power generation voltage is kept at a first set value of the regulation voltage (14 V, for example). The voltage control circuit 206 outputs a PWM signal whose on-duty is proportional to a difference between the first set value of the regulation voltage and the power generation voltage. This PWM signal is applied to the MOSFET 201 as an excitation drive signal through the AND circuit 209 to on/off-control the MOSFET 201.

The gradual excitation circuit 208 performs gradual excitation control in which the voltage control circuit 206 operates to gradually increase the excitation current. More specifically, the gradual excitation circuit 208 takes in the output signal from the AND circuit 209, and outputs a gradual excitation signal whose on-duty is the sum of the duty ratio of this output signal of the AND circuit and a predetermined increment. This gradual excitation signal is inputted to the AND circuit 209. Even when a large electrical load is applied, and as a result the on-duty of the PWM signal outputted from the voltage control circuit 206 increases rapidly, since the on-duty of the gradual excitation signal outputted from the gradual excitation circuit 208 increases at a rate determined by the predetermined increment, the on-duty of the excitation drive signal outputted from the AND circuit 209 to the MOSFET 201 increases only gradually.

The above gradual control by the gradual excitation circuit 208 is inhibited (released) when the power generation voltage of the vehicle generator 1 falls below a second set value lower than the first set value of the regulation voltage. That is, the gradual excitation control is performed when the power generation voltage is higher than the second set value. When the power generation voltage falls below the second set value, the gradual excitation control is released as explained above. However, in this case, increase of the excitation current is limited by power generation control in which the excitation current is limited to a value corresponding to a limit value determined by the excitation current limit value determination circuit 212. For example, the gradual excitation control is released by maintaining the gradual excitation signal at the high level when the power generation voltage falls below the second set value. In this embodiment, the second set value is lower than the open terminal voltage of the battery 3, so that the battery 3 can be prevented from being over-discharged due to rapid increase of the value of the applied electrical loads by increasing the power generation amount of the vehicle generator 1.

The excitation current measurement circuit 210 measures the excitation current flowing through the excitation winding 102 based on the source voltage of the MOSFET 201. More particularly, the excitation current measurement circuit 210 measures the excitation current based on a voltage drop across the sense resistor 203 connected to the source of the MOSFET 201, the voltage drop being proportional to the excitation current flowing through the source-drain path of MOSFET 20 and the sense resistor 203. The excitation current limiting circuit 207 limits the excitation current below the limit value determined by the excitation current limit value determination circuit 212 when the power generation voltage of the vehicle generator 1 falls below the second set value lower than the first set value. The excitation current limiting circuit 207 compares the excitation current measured by the excitation current measurement circuit 210 with the limit value determined by the excitation current limit value determination circuit 212, and outputs an excitation current limit signal of the low level when the measured excitation current is higher than the limit value, and of the high level when the measured excitation current is lower than the limit value. This excitation current limit signal is inputted to the AND circuit 209. Accordingly, when the excitation current exceeds the limit value, since the excitation current limit signal inputted to the AND circuit 209 changes to the low level, and accordingly the PWM signal outputted from the voltage control circuit 206 is masked by the AND circuit 209, the MOSFET 201 is turned off to prevent the excitation current from increasing further.

The rotation detection circuit 211 detects a phase voltage of one of the phases of the stator winding 101 to output a voltage corresponding to the rotational speed of the vehicle generator 1. Since the rotational speed of the vehicle generator 1 and that of the vehicle engine are in a one-to-one relationship, the rotation detection circuit 211 also serves as a circuit to detect the rotational speed of the vehicle engine. The excitation current limit value determination circuit 212 determines the limit value of the excitation current of the vehicle generator 1 in accordance with the rotational speed detected by the rotation detection circuit 211, and outputs it to the excitation current limiting circuit 207.

The torque required for the vehicle generator 1 to generate power (generator torque) depends on the power generation voltage, excitation current and rotational speed of the vehicle generator 1. Accordingly, the generator torque can be determined by specifying the power generation voltage, excitation current and rotational speed. In a different view, the excitation current necessary to generate the power generation torque can be determined by specifying the power generation voltage, rotational speed and generator torque. On the other hand, the upper limit of the torque which the engine can generate (engine permissible torque) depends on the rotational speed of the engine. The excitation current limit value determination circuit 212 stores data representing relationship among the power generation voltage, excitation current, rotational speed and generator torque of the vehicle generator 1, and data representing relationship between the rotational speed and permissible torque of the engine in a map form. These data may be formed in other forms such as table form or approximation expressions.

The excitation current limit value determination circuit 212 calculates the engine rotational speed based on the rotational speed of the vehicle generator 1 detected by the rotation detection circuit 211 to obtain the engine permissible torque corresponding to this engine rotational speed. The excitation current limit value determination circuit 212 also determines a value of the excitation current necessary to generate the generator torque coincident with this engine permissible torque as the limit value of the excitation current for the rotational speed of the vehicle generator at the time. If the excitation current is controlled below this limit value, since the generator torque is below the engine permissible torque, it is possible to prevent occurrence of engine stall. Incidentally, to determine the limit value of the excitation current, the power generation voltage, generator rotational speed and generator torque have to be known. However, since the power generation voltage varies not so much compared to the generator rotational speed and the excitation current, the power generation voltage is assumed to be constant (14 V, for example) to simplify operation and wiring of the power generation control apparatus in this embodiment.

In this embodiment, when the power generation voltage is kept around the first set value of the regulation voltage, and the excitation current is small, the gradual excitation control using the gradual control circuit 208, or limiting of the excitation current using the excitation current limiting circuit 207 are not in operation. In this case, the excitation current is controlled in accordance with the PWM signal inputted to the MOSFET 201 as the excitation drive signal from the voltage control circuit 206 through the AND circuit 209.

When the power generation voltage falls below the first set value of the regulation voltage due to application of an electrical load, the on-duty of the PWM signal outputted from the voltage control circuit 206 increases with the decrease of the power generation voltage. However, since the gradual control is performed by the gradual control circuit 208, the excitation current increases gradually.

When a large electrical load is applied, and the power generation voltage falls below the second set value of the regulation voltage, the gradual control by the excitation control circuit 208 is released to recover the large decrease of the power generation voltage, and instead, the excitation current is limited by the excitation current limiting circuit 207 such that the excitation current does not exceed the limit value determined by the excitation current limit value determining circuit 212. Since this limit value is set in accordance with the rotational speed of the vehicle generator 1 such that the generator torque does not exceed the engine permissible torque, it is possible to perform the power generation control to increase the power generation amount by as much as possible while preventing occurrence of engine stall.

As explained above, the excitation current limit value determining circuit 212 determined the limit value of the excitation current corresponding to the generator torque assuming that the power generation voltage is constant. However, the excitation current limit value determining circuit 212 may be configured to detect the power generation voltage based on the voltage outputted from the voltage divider circuit constituted of the resistors 204 and 205, and determines more precisely the limit value of the excitation current taking into account the detected power generation voltage.

Second Embodiment

Figure 2:
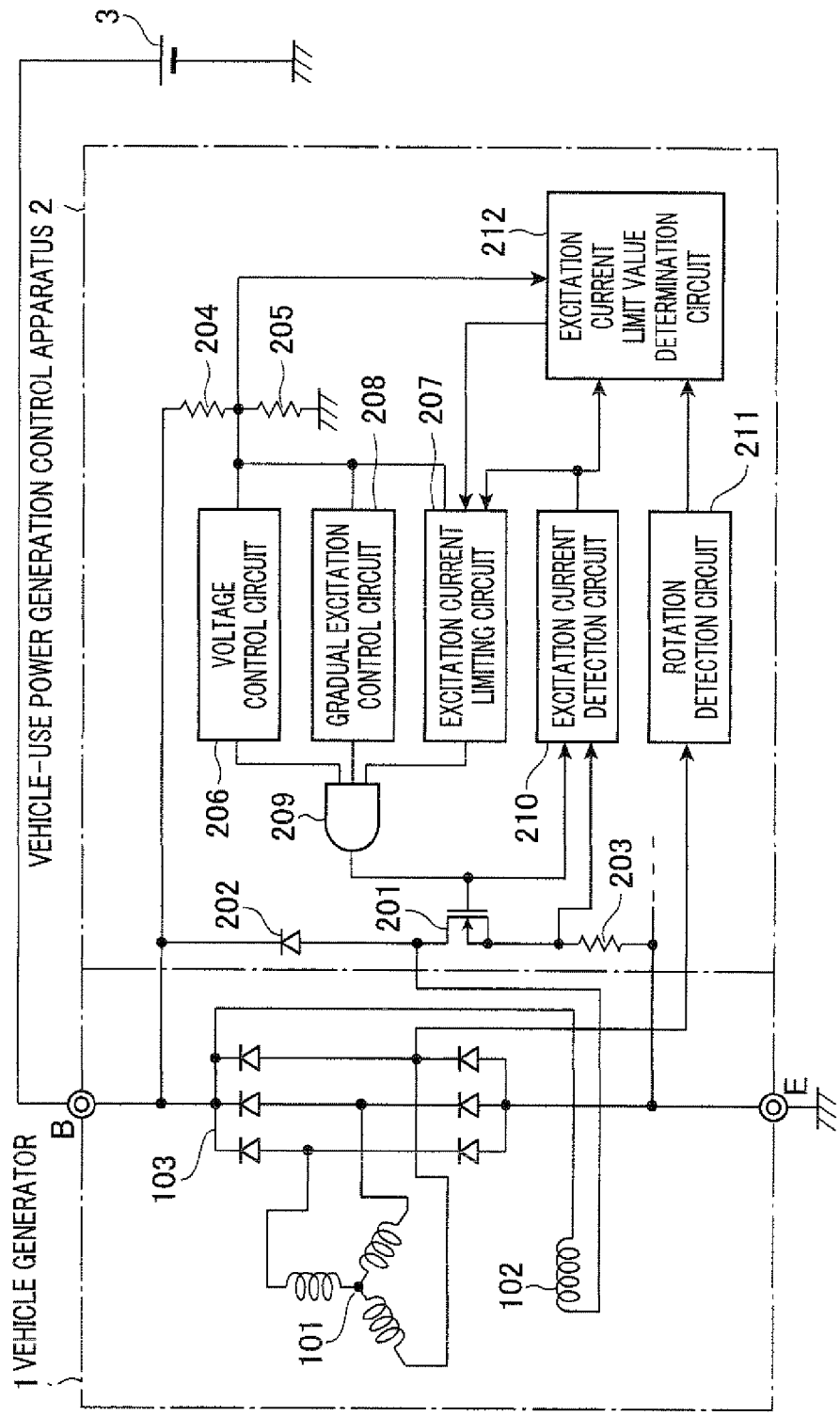
FIG. 2 is a diagram showing the structure of a modification of the vehicle-use power generation control apparatus as the first embodiment of the invention.

In the structure shown in FIGS. 1 and 2, the limit value of the excitation current is determined by the excitation current limit value determination circuit 212 of the power generation control apparatus 2. However, the limit value may be determined by an external control apparatus performing engine control as described below.

Figure 3:
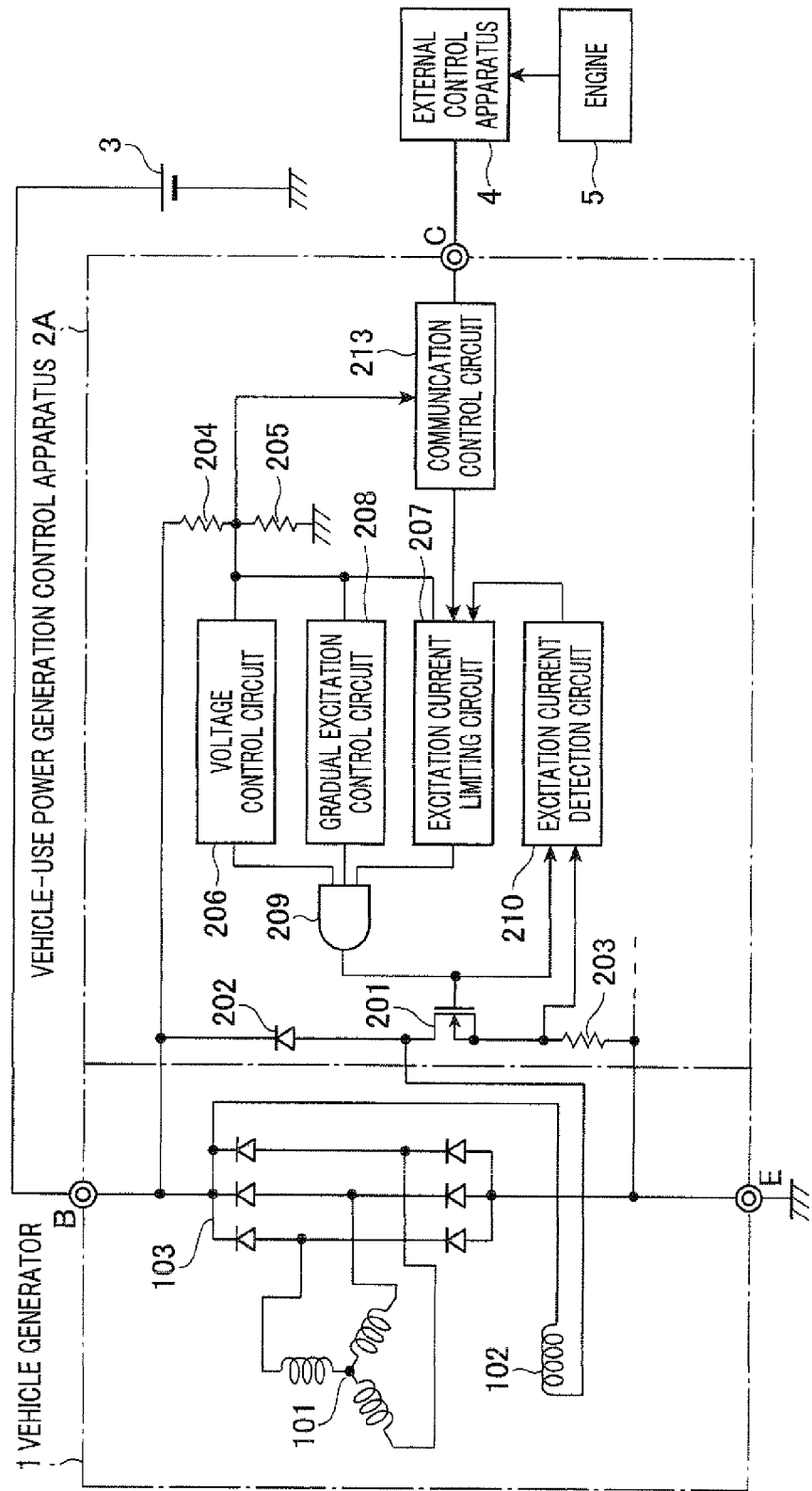
FIG. 3 is a diagram showing the structure of a vehicle-use power generation control system as a second embodiment of the invention.

FIG. 3 is a diagram showing the structure of a vehicle-use power generation control system as a second embodiment of the invention. The vehicle-use power generation control system of this embodiment includes a power generation control apparatus 2A. The power generation control apparatus 2A is different from the power generation control apparatus 2 shown in FIG. 2 in that the rotation detection circuit 211 and the excitation current limit value determination circuit 212 are replaced by a communication control circuit 213.

The communication control circuit 213 performs bi-directional serial communication (for example, LIN (Local Interconnect Network) communication using the LIN protocol) with an external control apparatus 4 through the C-terminal (communication terminal) in order to periodically transmit the power generation voltage to the external control apparatus 4, and receive a power generation command signal periodically transmitted from the external control apparatus 4.

The external control apparatus 4 has, in addition to a function of controlling an engine 5, the same function as the function of the excitation current limit value determination circuit 212 of the power generation control apparatus 2 shown in FIG. 2. The external control apparatus 4 determines the limit value of the excitation current on the basis of the power generation voltage and the engine rotational speed received from the power generation control apparatus 2A. Alternatively, the engine rotational speed may be detected by the external control apparatus 4 itself. When the external control apparatus 4 performs the engine control in accordance with the engine rotational speed, this engine rotational speed may be used to determine the limit value. Instead of using the engine rotational speed, the generator rotational speed may be used as in the first embodiment, because the engine rotational speed is equal to the generator rotational speed divided by the pulley ratio of the vehicle generator 1. The external control apparatus 4 transmits the power generation command signal including this limit value to the power generation control apparatus 2A.

The excitation current limiting circuit 207 of the power generation control apparatus 2A limits the excitation current below the limit value included in the power generation command signal when the power generation voltage of the vehicle generator 1 falls below the second set value lower than the first set value. Since the operation to limit the excitation current and the basic operations of the voltage control circuit 206 and the gradual excitation circuit 208 in this embodiment are the same as those in the first embodiment, explanations for them are omitted.

As described above, in the vehicle-use power generation control system of this embodiment, since the gradual excitation control is inhibited, and the excitation current is controlled not to exceed the limit value determined depending on the rotational speed of the engine 5 or the vehicle generator 1 when the power generation voltage falls, the power generation control can be performed so as to increase power generation amount while preventing occurrence of engine stall. Further, since the limit value of the excitation current is included in the power generation command signal transmitted from the external control apparatus 4, the power generation control apparatus 2A is not required to store various data for determining the limit value of the excitation current. As a result, since it is not necessary to configure the power generation control apparatus differently for different vehicle generators or different engines, it is possible reduce the number of parts of the power generation control apparatus.

It is a matter of course that various modifications can be made to the above first and second embodiments as described below.

In the first embodiment, the excitation current limit value determination circuit 212 determines the limit value of the excitation current based on the generator rotational speed detected by the rotation detection circuit 211 provided in the power generation control apparatus 2. However, the limit value of the excitation current may be determined based on the engine rotational speed transmitted from outside (the engine rotational speed received from the external control apparatus 4 shown in FIG. 3, for example) and received by the excitation current limit value determination circuit 212.

In the second embodiment, the power generation voltage is transmitted from the power generation control apparatus 2A to the external control apparatus 4. However, when the external control apparatus 4 is configured to determine the limit value of the excitation current, it is not necessary to transmit the power generation voltage from the power generation control apparatus 2A to the external control apparatus 4.

The first and second embodiments may be modified such that the gradual control and the limiting of the excitation current by the gradual excitation control circuit 208, excitation current limit value determination circuit 212, excitation current limiting circuit 207, and external control apparatus 4 are performed only when the generator rotational speed or engine rotational speed is below an idle speed. This makes it possible to prevent occurrence of engine stall when the engine is in the idle state in which the engine rotational speed is likely to be unstable.

Third Embodiment

Figure 4:
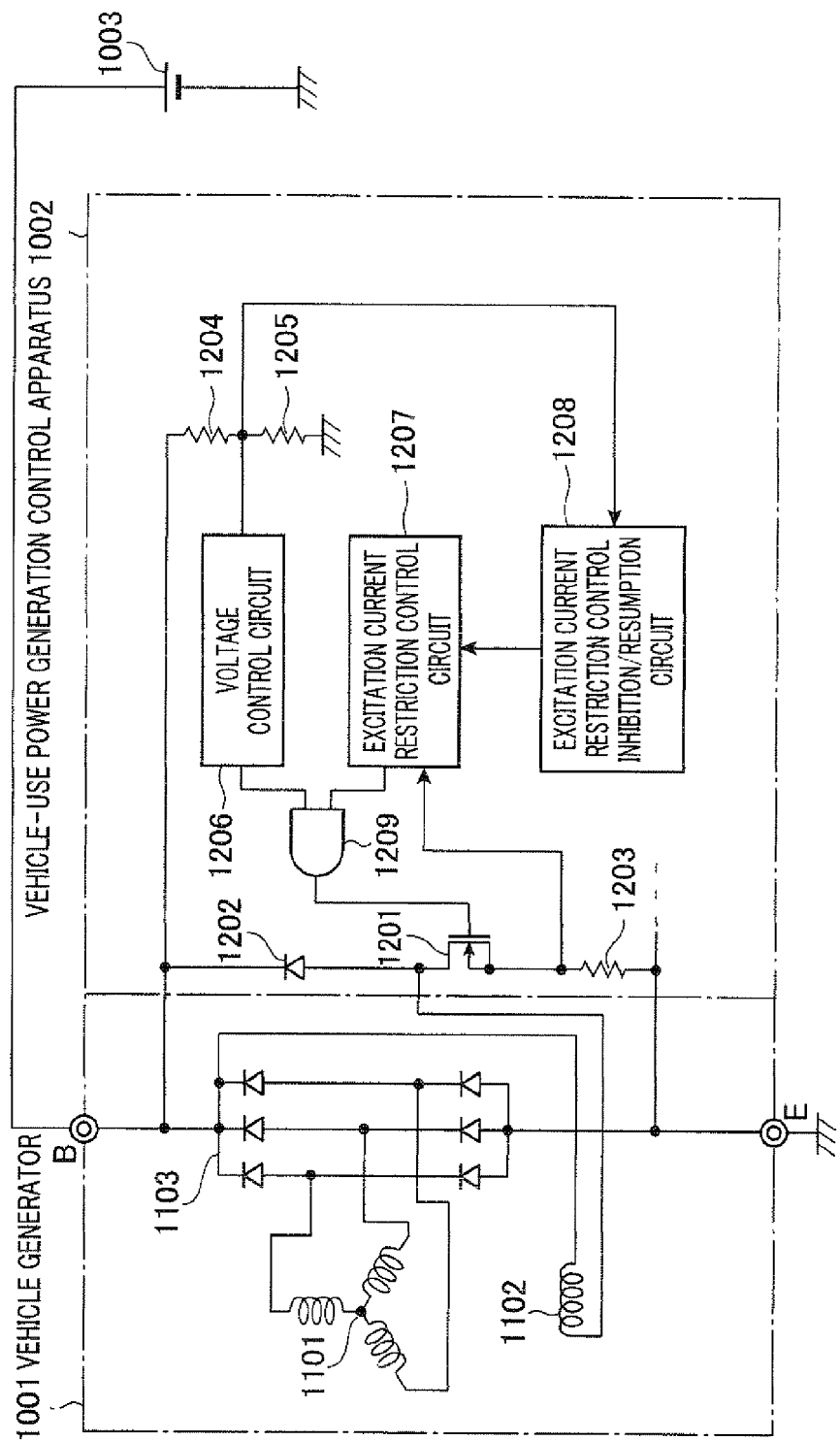
FIG. 4 is a diagram showing the structure of a vehicle-use power generation control apparatus as a third embodiment of the invention.

FIG. 4 shows the structure of a vehicle-use power generation control apparatus 1002 as a third embodiment of the invention, and a connection state of the power generation control apparatus 1002 with a vehicle generator 1001 and a battery 1003. Referring to FIG. 4, the power generation control apparatus 1002 performs power generation control to keep the voltage of the output terminal (B-terminal) of the vehicle generator 1 driven by a vehicle engine at a set value of a regulation voltage. The power generation control apparatus 1002 includes a ground terminal (E-terminal) other than the B-terminal. The B-terminal is connected to the battery 1003 through a charge line, and also connected to various electrical loads (not shown). The E-terminal is connected to the frame of the vehicle generator 1001. Although the power generation control apparatus 1002 is shown separately from the vehicle generator 1001 in FIG. 4, it is included in the vehicle generator 1001.

The vehicle generator 1001 includes a stator around which a three-phase stator winding 1101 is wound, a rotor around which an excitation winding 1102 is wound, and a rectifier circuit 1103 for full-wave rectifying the three-phase output of the stator winding 1101. The output of the rectifier circuit 1103 as the output voltage of the vehicle generator 1001 is controlled by on/off-controlling passage of an excitation current to the excitation winding 1102 by the power generation control apparatus 2.

The structure and operation of the power generation control apparatus 1002 are explained below in further detail. As shown in FIG. 4, the power generation control apparatus 1002 includes an N-channel MOSFET 1201, a flywheel diode 1202, a sense resistor 1203, resistors 1204 and 1205, a voltage control circuit 1206, an excitation current restriction control circuit 1207, an excitation current restriction control inhibition/resumption circuit 1208, and an AND circuit 1209.

The MOSFET 1201 is series-connected to the excitation winding 1102. The excitation current is passed to the excitation winding 1102 while the MOSFET 201 is in the ON state. The flywheel diode 1202 is parallel-connected to the excitation winding 1102. The flywheel diode 1202 passes an inductor current of the excitation winding 1102 generated when the MOSFET 1201 is turned off.

The resistors 1204 and 1205 constitute a voltage divider circuit. The output voltage (power generation voltage) of the vehicle generator 1001 is divided by this voltage divider circuit and supplied to the voltage control circuit 1206. The voltage control circuit 1206 measures the power generation voltage based on the voltage applied from the voltage divider circuit, and controls the excitation current of the vehicle generator 1001 such that the power generation voltage is kept at a first set value of the regulation voltage (14 V, for example). The voltage control circuit 1206 outputs a PWM signal whose on-duty is proportional to a difference between the first set value of the regulation voltage and the power generation voltage. This PWM signal is applied to the MOSFET 1201 as an excitation drive signal through the AND circuit 1209 to on/off-control the MOSFET 1201.

The excitation current restriction control circuit 1207 performs power generation restriction control in which the voltage control circuit 1206 operates to gradually increase the excitation current. More specifically, the excitation current restriction control circuit 1207 takes in the output signal of the AND circuit 1209, and outputs a power generation restriction signal whose on-duty is the sum of the duty ratio of this output signal of the AND circuit 1209 and a predetermined increment. This power generation restriction signal is inputted to the AND circuit 1209. Even when a large electrical load is applied, and as a result the on-duty of the PWM signal outputted from the voltage control circuit 1206 increases rapidly, since the on-duty of the power generation restriction signal outputted from the excitation current restriction control circuit 1207 increases at a rate determined by the predetermined increment, the on-duty of the excitation drive signal outputted from the AND circuit 1209 to the MOSFET 1201 increases only gradually.

The excitation current restriction control inhibition/resumption circuit 1208 inhibits the power generation restriction control by the excitation current restriction control circuit 1207 when the power generation voltage of the vehicle generator 1001 falls below a second set value lower than the first set value while the power generation restriction control is performed by the excitation current restriction control circuit 1207. Further, if the power generation voltage of the vehicle generator 1 exceeds the second set value after the power restriction control by the excitation current restriction control circuit 1207 is inhibited, the excitation current restriction control inhibition/resumption circuit 1208 maintains the inhibition of the power generation restriction control until the power generation voltage exceeds a third set value higher than the second set value and lower than the first set value. When the power generation voltage exceeds the third set value, the excitation current restriction control inhibition/resumption circuit 1208 commands the excitation current restriction control circuit 1207 to release the inhibition of the power generation restriction control, that is, to resume the power generation restriction control.

Incidentally, to inhibit the power generation restriction control, the excitation current restriction control inhibition/resumption circuit 1208 transmits a command to that effect to the excitation current restriction control circuit 1207 so that the power generation restriction signal outputted from the excitation current restriction control circuit 1207 is maintained at the high level. In this embodiment, the second set value is lower than the open terminal voltage of the battery 1003, so that the battery 1003 can be prevented from being over-discharged due to rapid increase of the applied electrical load value by increasing the power generation amount of the vehicle generator 1001.

In this embodiment, when the power generation voltage is kept around the first set value of the regulation voltage, and the excitation current is small, the power generation restriction control using the excitation current restriction control circuit 1207 is not in operation. In this case, the excitation current is controlled in accordance with the PWM signal as the excitation drive signal inputted to the MOSFET 1201 from the voltage control circuit 1206 through the AND circuit 1209.

When the power generation voltage falls below the first set value of the regulation voltage due to application of an electrical load, the on-duty of the PWM signal outputted from the voltage control circuit 1206 increases with the decrease of the power generation voltage. However, since the power generation restriction control is performed by the excitation current restriction control circuit 1207, the excitation current increases only gradually.

When a large electrical load is applied, and the power generation voltage falls below the second set value, the excitation current restriction control inhibition/resumption circuit 1208 releases (inhibits) the power generation restriction control by the excitation current restriction control circuit 1207 to recover from the large drop of the power generation voltage. This state of inhibition of the power generation restriction control is maintained until the power generation voltage exceeds the third set value of the regulation voltage.

Figure 5:
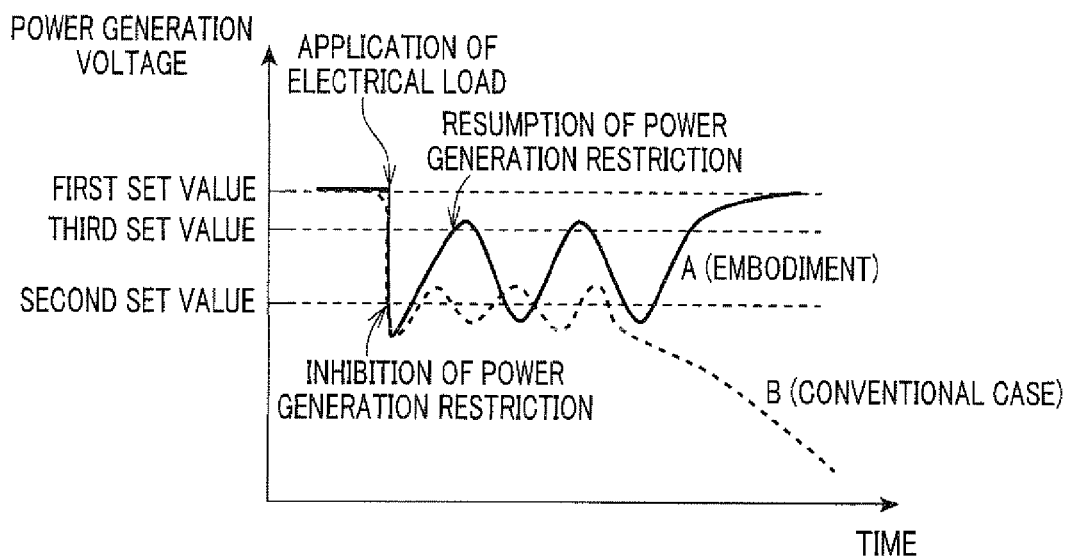
FIG. 5 is a diagram showing temporal variation of the power generation voltage of a vehicle generator after an electrical load is applied to the vehicle generator when a vehicle engine is in an idle state.

FIG. 5 is a diagram showing temporal variation of the power generation voltage after an electrical load is applied to the vehicle generator when the vehicle engine is in an idle state. In FIG. 5, the horizontal axis represents the elapsed time, and the vertical axis represents the power generation voltage. The broken line B in FIG. 5 shows temporal variation of the power generation voltage in a conventional case where the power generation restriction control is inhibited when the power generation voltage falls below the second set value, and resumed when the power generation voltage exceeds the second set value, while the solid line A represents that in the case of this embodiment.

Figure 6:
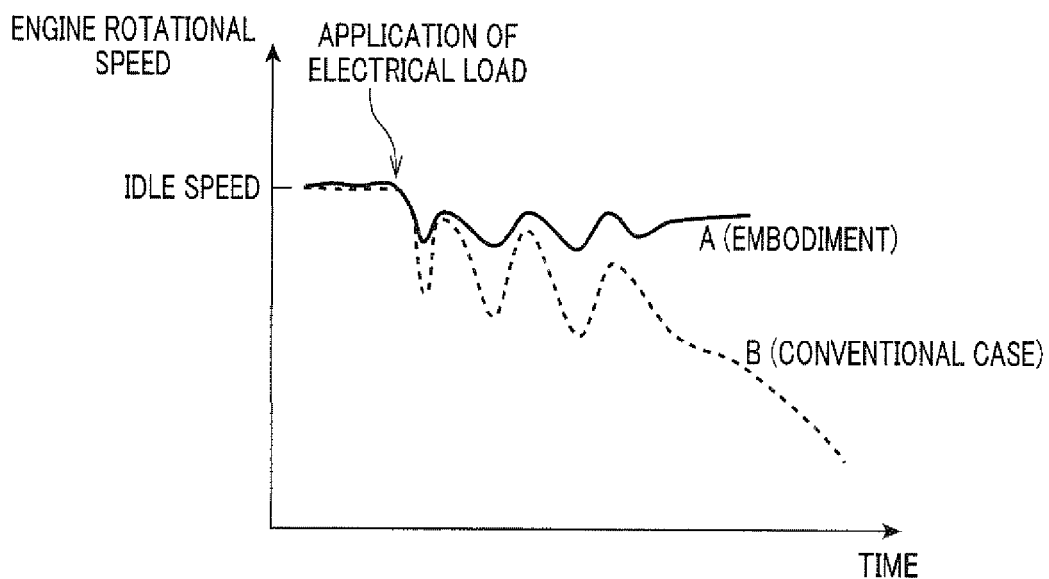
FIG. 6 is a diagram showing temporal variation of the rotational speed of the vehicle engine in the idle state after the electrical load is applied to the vehicle generator.

FIG. 6 is a diagram showing temporal variation of the engine rotational speed after the electrical load is applied to the vehicle generator when the vehicle engine is n the idle state. In FIG. 5, the horizontal axis represents the elapsed time, and the vertical axis represents the engine rotational speed. The broken line B in FIG. 6 shows temporal variation of the engine rotational speed in the conventional case where the power generation restriction control is inhibited when the power generation voltage falls below the second set value, and resumed when the power generation voltage exceeds the second set value, while the solid line A represents that in the case of this embodiment.

As seen from FIGS. 5 and 6, according to this embodiment in which voltage hysteresis is provided by making a difference between the reference voltage (the second set value) to determine inhibition of the power generation restriction control and the reference voltage (the third set value) to determine resumption of the power generation restriction control, it is possible to prevent the power generation torque from varying due to frequent switching between inhibition and resumption of the power generation restriction control, to thereby prevent the engine rotational speed from varying widely and becoming unstable. Further, since some time period can be ensured before the power generation restriction control is resumed after it is inhibited, the operating voltage of vehicle-mounted equipment (the power generation voltage) can be restored.

The difference between the third set voltage and the second set voltage is preferably larger than the range of the variation of the power generation voltage of the engine ignition period. For example, when the vehicle engine is an 8-cylinder engine whose idle speed is 7,000 rpm, engine pulsation occurs at the ignition period equal to 10 ms (=1/((700×8)/60) ms), and accordingly the power generation voltage of the vehicle generator varies within a certain range at this period. By setting the third set voltage such that the power generation voltage varying within this certain range does not exceed the third set voltage, it is possible to prevent the power generation restriction control from being inhibited and resumed at frequent intervals in conjunction with the pulsation of the engine rotation, and accordingly to stabilize the engine rotation and restore the power supply voltage.

Figure 7:
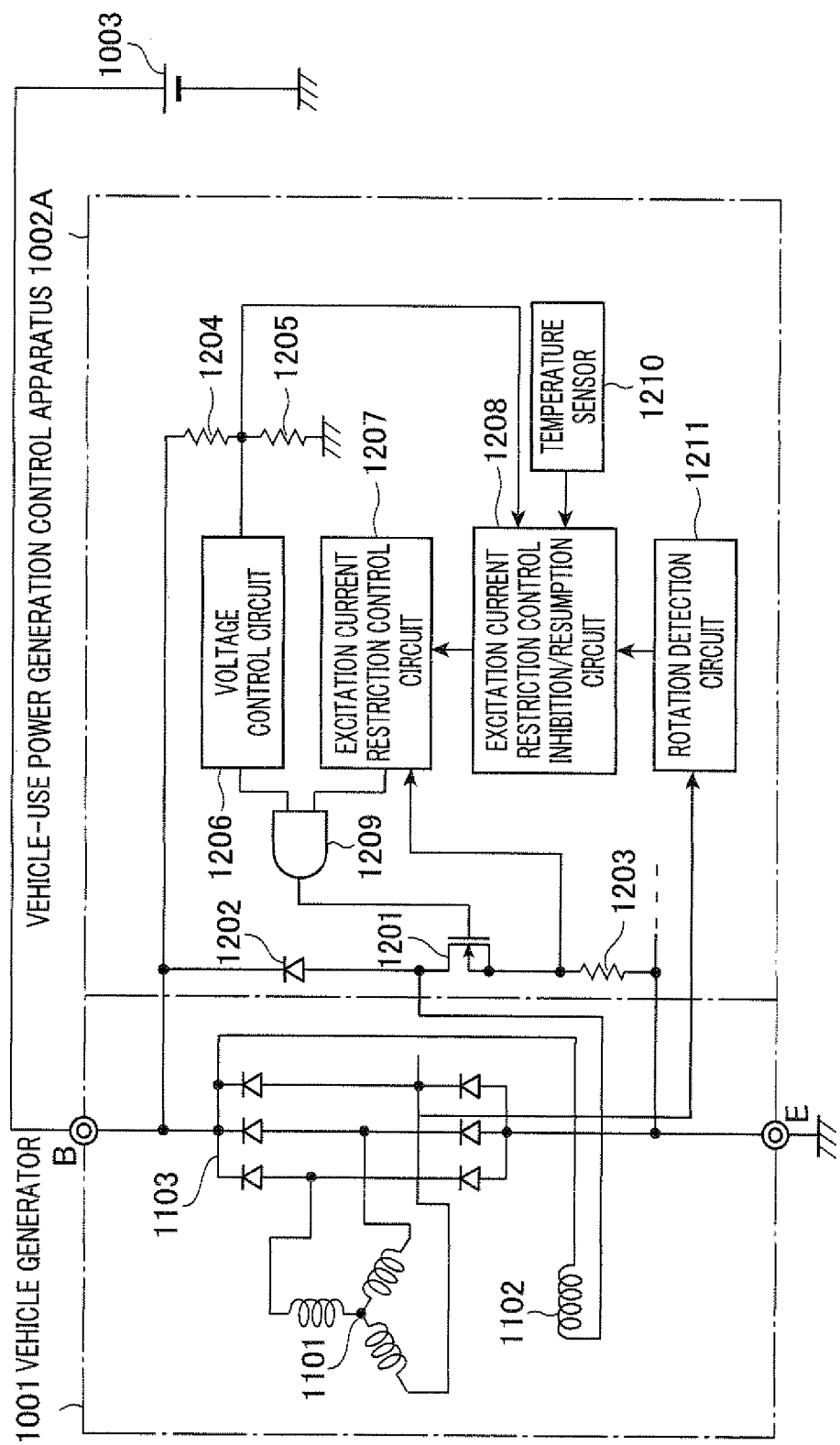
FIG. 7 is a diagram showing the structure of a modification of the vehicle-use power generation control apparatus shown in FIG. 4, in which power generation control is performed in accordance with at least one of the rotational speed and temperature of the vehicle generator.

Preferably, the difference between the third set value and the second set value is variably set in accordance with at least one of the rotational speed and the temperature of the vehicle generator 1001. FIG. 7 is a diagram showing the structure of a vehicle-use power generation control apparatus 1002A as a modification of the vehicle-use power generation control apparatus 1001. In this modification, the power generation control is performed based on at least one of the rotational speed and the temperature of the vehicle generator 1001. The power generation control apparatus 1002A differs from the power generation control apparatus 1001 in that a temperature sensor 1210 and a rotation detection circuit 1211 are added.

The temperature sensor 1210 detects the temperature of the power generation control apparatus 1002A, that is, the temperature of the vehicle generator 1001 including therein the power generation control apparatus 1002A. The temperature sensor 1210 may be a thermistor or a diode, the voltage across which varies according to the temperature. Since the power generation capacity of the vehicle generator 1001 decreases with the increase of the temperature thereof, the variation of the power generation voltage due to the variation of the rotational speed becomes smaller as the temperature of the vehicle generator 1 increases. Accordingly, the difference between the third and second set values is set smaller when the temperature is higher, and set larger when the temperature is lower. This variable setting in accordance with the temperature is performed by the excitation current restriction control inhibition/resumption circuit 1208.

The rotation detection circuit 1211 detects a phase voltage of one of the phases of the stator winding 1101 to output a voltage corresponding to the rotational speed of the vehicle generator 1001. Since the power generation capacity of the vehicle generator 1001 decreases with the decrease of the rotational speed thereof, the variation of the power generation voltage due to the variation of the rotational speed becomes smaller as the rotational speed of the vehicle generator 1001 decreases. Accordingly, the difference between the third and second set values is set smaller when the rotational speed is lower, and set larger when the rotational speed is higher. This variable setting in accordance with the rotational speed is performed by the excitation current restriction control inhibition/resumption circuit 1208.

As described above, since the power generation amount of the vehicle generator 1 varies depending on the rotational speed and the temperature, the range of the variation of the power generation voltage also varies depending on the rotational speed and the temperature. Accordingly, by variably setting the difference between the third and second set values, for example, by variably setting the third voltage depending on the rotational speed or the temperature, it is possible to stabilize the engine rotational speed and restore the power generation voltage in accordance with the power generation capacity.

Figure 8:
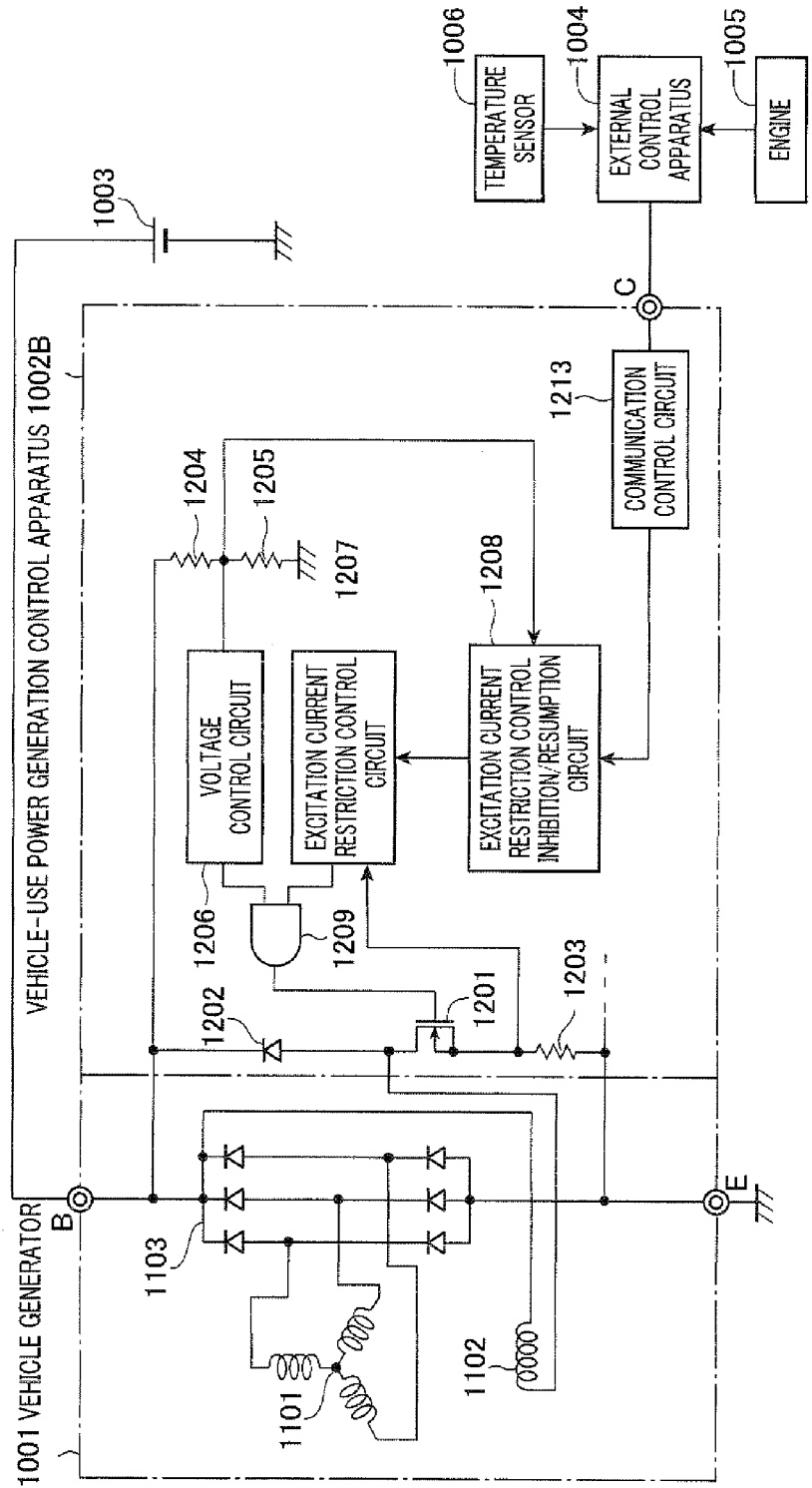
FIG. 8 is a diagram showing the structure of another modification of the vehicle-use power generation control apparatus shown in FIG. 4, in which the power generation control is performed in accordance with data transmitted from an external control apparatus.

The difference between the third and second set values may be variably set in accordance with data transmitted from an external control apparatus. FIG. 8 is a diagram showing the structure of a power generation control apparatus 1002B as a modification of the vehicle-use power generation control apparatus 1002, in which the power generation control is performed in accordance with data transmitted from an external control apparatus 1004. The power generation control apparatus 1002B differs from the power generation control apparatus 1002 shown in FIG. 4 in that a communication control circuit 1213 is added.

The communication control circuit 1 213 performs bi-directional serial communication (for example, LIN (Local Interconnect Network) communication using the LIN protocol) with the external control apparatus 1004 through a C-terminal (communication terminal) in order to periodically transmit the power generation voltage etc. to the external control apparatus 1004, and receive a power generation command signal periodically transmitted from the external control apparatus 1004.

The external control apparatus 1004 has, in addition to a function of controlling the engine 1005, a function of transmitting the power generation command signal including at least one of the engine rotational speed and the vehicle temperature to the power generation control apparatus 1002B. The power generation control apparatus 1002E receives the power generation command signal at the communication control circuit 213, and transfers at least one of the engine rotational speed and the vehicle temperature to the excitation current restriction control inhibition/resumption circuit 1208. The excitation current restriction control inhibition/resumption circuit 1208 variably sets the difference between the third and second set values in accordance with the engine rotational speed or the vehicle temperature received from the communication control circuit 1213. The operation of the variable setting is basically the same as that in the power generation control apparatus 1002A shown in FIG. 7 as described in the following. There is a positive correlation between the vehicle temperature and the temperature of the vehicle generator 1001. Accordingly, the power generation capacity of the vehicle generator 1001 decreases with the increase of the vehicle temperature. Further, since the engine rotational speed and the generator rotational speed are in a one-to-one relationship, the power generation capacity of the vehicle generator 1 decreases with the decrease of the engine rotational speed. Hence, the difference between the third and second set values is set smaller when the power generation capacity is lower, and set larger when the power generation capacity is higher. As explained above, by setting a degree of the voltage hysteresis in accordance with various data acquired at the external control apparatus 1004, it is possible to stabilize the engine rotation and restore the power generation voltage in accordance with the power generation capacity.

It is a matter of course that various modifications can be made to the above third embodiment as described below.

The third embodiment is provided with the voltage hysteresis by making a difference between the second and third set values as the references to determine inhibition and resumption of the power generation restriction control in order to prevent frequent switching between inhibition and resumption of the power generation restriction control. However, the frequent switching between inhibition and resumption of the power generation restriction control may be prevented by configuring the third embodiment such that the power generation restriction control is not resumed until a predetermined time period elapses after it is inhibited (that is, the power generation restriction control is continued at least during the predetermined time period). In this case, the basic structure of the power generation control apparatus can be the same as that shown in FIG. 1.

In this case, the excitation current restriction control inhibition/resumption circuit 1208 maintains inhibition of the power generation restriction control until the predetermined time period elapses after the inhibition is made by the excitation current restriction control circuit 1207 even when the power generation voltage exceeds the second set value. If the power generation voltage is higher than the second set value after the predetermined time period has elapsed, the excitation current restriction control inhibition/resumption circuit 1208 commands the excitation current restriction control circuit 1207 to release the inhibition, that is, to resume the power generation restriction control.

By ensuring a certain time period between when the power generation restriction control is inhibited and when the power generation restriction control is resumed thereafter, it is possible to prevent the power generation torque from varying frequently due to frequent switching between inhibition and resumption of the power generation restriction control, to thereby prevent the engine rotational speed from varying widely and to stabilize the engine rotation. Further, since some time period can be ensured between inhibition and resumption of the power generation restriction control, the power supply voltage can be restored reliably.

The above predetermined time period is preferably longer than the engine ignition period in order to prevent the frequent switching between inhibition and resumption of the power generation restriction control in conjunction with the pulsation of the engine rotation occurring coincidentally with the engine ignition period, and also to restore the power generation voltage.

The above predetermined time period may be variably set in accordance with at least one of the rotational speed and the temperature of the vehicle generator 1001. In this case, the basic structure of the power generation control apparatus can be the same as that shown in FIG. 7. The degree of the pulsation of the power generation voltage (variation of the period or voltage amplitude) depends on the rotational speed and temperature of the vehicle generator 1001. Accordingly, by varying the predetermined time period, which is set as the minimum time period between when the power generation restriction control is inhibited and when the power generation restriction control is resumed thereafter, in accordance with the rotational speed or temperature of the vehicle generator 1001, it is possible to stabilize the engine rotation and restore the power generation voltage in accordance with the degree of the pulsation of the power generation voltage.

The above predetermined time period may be variably set in accordance with data transmitted from the external control apparatus. In this case, the basic structure of the power generation control apparatus can be the same as that shown in FIG. 8. According to this configuration, since the predetermined time period can be variably set as a delay time between when the power generation restriction control is inhibited and when the power generation restriction control is resumed thereafter, in accordance with various data acquired at the external control apparatus 1004, it is possible to stabilize the engine rotation and also to restore the power generation voltage.

In an example, the above predetermined time period is variably set in accordance with at least one of the engine rotational speed and the vehicle temperature acquired at the external control apparatus 1004. The degree of the pulsation of the power generation voltage (variation of the period or voltage amplitude) depends on the engine rotational speed and the vehicle temperature. Accordingly, by varying the predetermined time period, which is set as the minimum time period between when the power generation restriction control is inhibited and when the power generation restriction control is resumed thereafter, in accordance with the engine rotational speed or vehicle temperature, it is possible to stabilize the engine rotation and restore the power generation voltage in accordance the degree of the pulsation of the power generation voltage.

The third embodiment may be modified such that inhibition and resumption of the power generation restriction control are performed only when the engine is in the idle sate (or only when the engine rotational speed is lower than or equal to the idle speed) where the engine rotation is likely to be unstable. According to this modification, it is possible to prevent occurrence of engine stall when the engine is in the idle state where the engine rotation is likely to be unstable, and to prevent the operating voltage (power generation voltage) from falling and not being restored.

The above explained preferred embodiments are exemplary of the invention of the present application which is described solely by the claims appended below. It should be understood that modifications of the preferred embodiments may be made as would occur to one of skill in the art.

What is claimed is:

1. A vehicle-use power generation control apparatus comprising:

a voltage control means for controlling an excitation current of a vehicle generator driven by an engine such that a power generation voltage of the vehicle generator is kept at a first set value;

an excitation current restriction control means for restricting increase of the excitation current when the excitation current is increased by the voltage control means;

a restriction control inhibition means for inhibiting restriction control by the excitation current restriction control means when the power generation voltage of the vehicle generator falls below a second set value lower than the first set value during the restriction control by the excitation current restriction control means; and a restriction-control inhibition maintaining means for maintaining the restriction control by the excitation current restriction control means until the power generation voltage of the vehicle generator exceeds a third set value higher than the second set value and lower than the first set value in a case where the power generation voltage of the vehicle generator exceeds the second set value after the restriction control by the restriction-control inhibition means is inhibited by the restriction control inhibition means.

2. The vehicle-use power generation control apparatus according to claim 1, wherein a difference between the third and second set values is set larger than a variation range of the power generation voltage corresponding to an ignition control cycle period of the engine.

3. The vehicle-use power generation control apparatus according to claim 1, wherein a difference between the third and second set values is variably set in accordance with at least one of a rotational speed and a temperature of the vehicle generator.

4. The vehicle-use power generation control apparatus according to claim 1, wherein a difference between the third and second set values is variably set in accordance with data transmitted from an external control apparatus.

5. The vehicle-use power generation control apparatus according to claim 4, wherein the external control apparatus acquires at least one of an engine rotational speed and a vehicle temperature, and the difference between the third and second set values is variably set in accordance with at least one of the engine rotational speed and the vehicle temperature.

* * * * *